United States Patent [19]

Baudat

[11] Patent Number: 5,678,677
[45] Date of Patent: Oct. 21, 1997

[54] METHOD AND APPARATUS FOR THE CLASSIFICATION OF AN ARTICLE

[75] Inventor: Gaston Baudat, Geneva, Switzerland

[73] Assignee: Mars Incorporated, McLean, Va.

[21] Appl. No.: 448,360

[22] PCT Filed: Nov. 30, 1993

[86] PCT No.: PCT/GB93/02468

§ 371 Date: Aug. 4, 1995

§ 102(e) Date: Aug. 4, 1995

[87] PCT Pub. No.: WO94/12951

PCT Pub. Date: Jun. 9, 1994

[30] Foreign Application Priority Data

Nov. 30, 1992 [CH] Switzerland ............... 3657/92

[51] Int. Cl.[6] .................................................. G07D 7/00
[52] U.S. Cl. ................................. 194/206; 194/317
[58] Field of Search .............................. 194/206, 207, 194/317, 318, 319

[56] References Cited

U.S. PATENT DOCUMENTS

| 5,016,188 | 5/1991 | Lan ........................... 364/513 |
| 5,199,543 | 4/1993 | Kamagami et al. ............. 194/207 |
| 5,330,041 | 7/1994 | Dobbins et al. .............. 194/206 |

FOREIGN PATENT DOCUMENTS

| 0165734 | 12/1985 | European Pat. Off. . |
| 0440137 | 8/1991 | European Pat. Off. . |
| 0472192 | 2/1992 | European Pat. Off. . |
| 4208727 | 10/1992 | Germany . |
| 4-118796 | 4/1992 | Japan ........................... 194/206 |
| 640433 | 1/1984 | Switzerland . |
| 2059129 | 4/1981 | United Kingdom . |
| 2238152 | 5/1991 | United Kingdom . |
| 2254949 | 10/1992 | United Kingdom . |

OTHER PUBLICATIONS

IEEE Transactions On Neural Networks, vol. 3 No. 2, Mar. 1992, Fukumi et al., "Rotation–Invariant Neural Pattern Recognition System with Application To Coin Recognition", copy in 194/317.

Primary Examiner—F. J. Bartuska
Attorney, Agent, or Firm—Fish & Richardson P.C.

[57] ABSTRACT

In a process for the classification of an article such as a banknote described by of a k-dimensional feature vector (AGF) which is prepared by a preliminary processing system (7), a test specimen is either assigned to one of n target classes or classified as a counterfeit. For the n target classes n recognition units (15.1 to 15.n) are used, exactly one of the n target classes being recognisable by one recognition unit (15.j) using a respective feature vector (AGFj) prepared for that class. A recognised target class is transmitted by an output unit (14) to a service system (11). There are assigned to a target class in a learning phase several k-dimensional target vectors which are compared with the feature vector during the classification. The recognition unit (15.j) is advantageously a neural network, one neuron comparing the feature vector (AGFj) with one of the target vectors.

23 Claims, 2 Drawing Sheets

METHOD AND APPARATUS FOR THE CLASSIFICATION OF AN ARTICLE

FIELD OF THE INVENTION

The invention relates to a method and apparatus for the classification of an article, particularly, but not exclusively, a monetary unit such as a banknote or a coin.

BACKGROUND OF THE INVENTION

Such methods are advantageously used in vending machines, change machines and the like, where classification is carried out, on the one hand, according to value, for example between one-, two- and five-dollar notes, and/or, on the other hand, between originals and copies or counterfeits thereof.

The method of the invention can also be applied quite generally for the classification of test specimens, for example of images, graphs, documents, stamps or signals.

It is known to process intensity values of electromagnetic radiation reflected by image parts of a test specimen in such a manner that the test specimen can be compared with a pixel matrix (EP 0 067 898 B1) of an original, or that differences from an original are expressed and evaluated in the form of an angle between two n-dimensional vectors (DE 30 40 963 A1) or as a cross-correlation function (EP 0 084 137 A2).

It is further known that valid value ranges of at least two measurements of a coin or a banknote describe a rectangle (GB 2 238 152 A) or an ellipse (GB 2 254 949 A) and that the coin or the banknote is accepted if a point formed by at least two measurements lies inside the rectangle or the ellipse.

It is also known (CH 640 433 A5) to compare various measurable physical variables of a test specimen with corresponding stored threshold values substantially independently of one another and, after successful classification, to correct the threshold values using the measurable variables of the accepted test specimen.

Various formulations for learning classifiers are furthermore known (H. Niemann: "Klassifikation von Mustern"— Berlin, Heidelberg, Berlin, Tokyo: Springer 1983) in which the class ranges are continuously altered using classified patterns and which require a considerable amount of calculation during the classification, which, in practical use, may lead to unacceptable response times.

In a classification process, particularly for classification of a monetary unit, differentiation between originals and copies/counterfeits thereof is especially problematical since, on the one hand, originals and copies/counterfeits thereof are extremely similar to each other or differ only slightly in their features and, on the other hand, only a small number of different copies/counterfeits of an original is available. Indeed, some counterfeits may not be available at all when the process is set up. A further problem is that the features of an original, for example the features of all genuine ten-frank notes of different issues, may show a wide dispersion.

It would be desirable to provide a process for the classification of a pattern, with which a pattern can be reliably classified even when features of one class differ little from the corresponding features of at least one other class and/or when features of the class are widely dispersed, and to create a device with which the process can be carried out. It would also be desirable to provide a process which is likely to be capable of distinguishing between genuine and counterfeit articles of currency, even when the counterfeits are not available when the process is being set up.

SUMMARY OF THE INVENTION

Aspects of the present invention are set out in the accompanying claims.

BRIEF DESCRIPTION OF THE DRAWINGS

An illustrative embodiment of the invention is described in detail below with reference to the drawings, in which.

DETAILED DESCRIPTION

Figure 1:
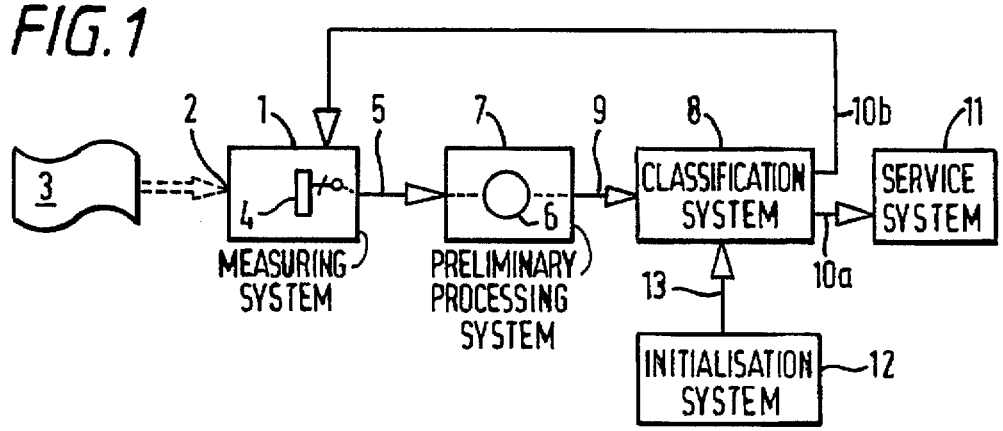
FIG. 1 is a block diagram of a device for classifying a pattern.

In FIG. 1, reference numeral 1 denotes a measuring system substantially comprising an inlet 2 and a transport system, not shown, for a test specimen 3 and a group of sensors 4 with which a pattern of the test specimen 3 is measured. The measuring system 1 is connected by a feature channel 5 to a preliminary processing system 7 having at least one preliminary processing activity 6. A classification system 8 is connected via an input channel 9 to the preliminary processing system 7 and via a first output channel 10a to a service system 11. If necessary, the classification system 8 is also connected to the measuring system 1 via a second output channel 10b. The measuring system 1, the preliminary processing system 7, the classification system 8 and the service system 11 are, therefore, connected by channels substantially to form a chain which is terminated by the service system 11.

If necessary, an initialisation system 12 is connected to the classification system 8 via an initialisation channel 13.

Figure 2:
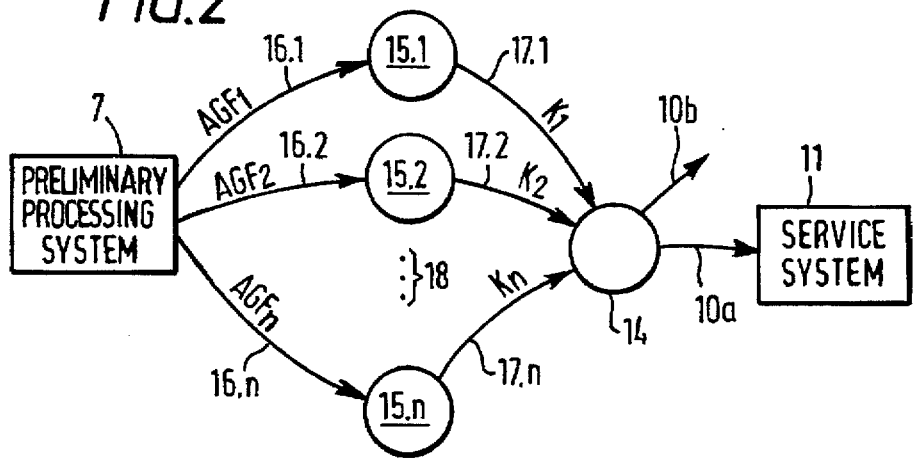
FIG. 2 shows the principle of a classification system.

FIG. 2 shows by means of a data flow diagram the construction in principle of the classification system 8 arranged between the preliminary processing system 7 and the service system 11. In the method of representation chosen, which is known from the literature (D. J. Hatley, I. A. Pirbhai: Strategies for Real-Time System Specification, Dorset House, NY 1988), a circle denotes an activity, a rectangle a terminator and an arrow a communication channel for the transmission of data and/or results, the tip of the arrow pointing substantially in the direction of flow of the data. Furthermore, an arrangement consisting of two activities connected by a communication channel is equivalent to a single activity that fulfils all the functions of the two activities.

Activities are implemented in the form of an electronic circuit and/or in the form of a process, a part of a program or a routine.

The classification system has an output unit 14 which is connected to the two output channels 10a and 10b, and a specific number n of recognition units are connected to the output unit 14, there being shown in FIG. 2, for the sake of a general and simple representation, only three of the n recognition units actually present.

15.1 denotes a first recognition unit, which is connected via a first input data channel 16.1 for a first input vector $AGF_1$ to the preliminary processing system 7 and via a first output data channel 17.1 for a first signal $K_1$. 15.2 further denotes a second recognition unit, which is connected via a second input data channel 16.2 for a second input vector $AGF_2$ to the preliminary processing system 7 and via a second output data channel 17.2 for a second signal $K_2$. Finally, 15.n denotes an nth recognition unit, which is connected via an n-th input data channel 16.n for an n-th input vector $AGF_n$ to the preliminary processing system 7 and via an n-th output data channel 17.n for an n-th signal $K_n$.

Three dots 18 indicate the other recognition units, not shown, each of which is connected via a further input data channel to the preliminary processing system 7 and via a further output data channel to the output unit 14, each further input data channel being able to transmit a further input vector AGF and each output data channel being able to transmit a further signal K.

The input channel 9 (FIG. 1) is represented in FIG. 2 by the n input data channels 16.1 to 16.n.

Each of the recognition units 15.1 to 15.n is arranged to determine whether its input vector AGF represents a particular, respective target class, and to provide an output signal K in response thereto. Advantageously, there are defined for an original of one class as many target classes (and corresponding recognition units 15) as there are scanning directions available in the measurement of physical features of the original in the measuring system 1. If the test specimen is a document printed on both sides, then, for example, the four scanning orientations "face-up moving forwards", "face-up moving backwards", "face-down moving forwards" and "face down moving backwards" could be available.

In the classification of a test specimen that is either a ten-frank note, a twenty-frank note or a fifty-frank note with each of the four possible scanning directions, twelve different target classes, for example, are obtained.

The output unit 14 informs the service system 11 and/or the measuring system 1 either of the target class of the test specimen 1 ascertained by the classification system 8 or of the fact that the test specimen 1 is a counterfeit. Advantageously, the output unit indicates the target class of the test specimen 1 when, and only when, exactly one of the n recognition units 15.1 to 15.n recognises its target class. Otherwise the test specimen is indicated to be a counterfeit.

In the classification of the test specimen 1, the n recognition units 15.1 to 15.n may operate successively (for example using a single processor executing sequential processing), but advantageously they operate concurrently, or at least partly concurrently.

Our Swiss Patent Application No. 00 753/92-4, and corresponding U.S. application Ser. No. 08/013,708, filed 4th Feb. 1993 now U.S. Pat. No. 5,503,262, and EP-A-560023, (the contents of which are incorporated herein by reference) disclose a measuring system and a processing system for generating a feature vector from values of measured features of a test specimen. The arrangements disclosed therein for this purpose may also be used to advantage in apparatus according to the present invention. In particular, referring to the description relating to FIGS. 1 and 2 in the above-mentioned cases, the receiving system 1, the pre-processing system 7 and the activities 14 and 17 in the classification system 8, which are performed on the basis of the data received from the pre-processing system and the data stored in the data memory 23, may also be used in an arrangement according to the present invention, although the activities 14 and 18 would in the present case be performed by the preliminary processing system 7 shown in the accompanying FIG. 1.

In one specific example, the measuring system 1 may be arranged to scan a banknote along N lines, using optical sensors. There may be for example three lines, two on one face of the banknote and one on the reverse face. Each scan line will contain L individual areas, which are scanned in succession. In each area, there may be for example measurements of M different features (for example the reflectance intensities of red, green and infra-red radiation, where M=3). The total number of measurements for the banknote would therefore be equal to N×M×L. These measurements are delivered to the preliminary processing system 7 along the feature channel 5. The system 7 will then derive, for each scanning point, a k-dimensional local feature vector. The individual components of the vector may represent the parameters described in the earlier applications, or alternatively may represent:

(a) The spectrally normalised intensity of the infra-red radiation (i.e. the reflection intensity of the infra-red radiation divided by the sum of the reflected intensities of the infra-red, green and red radiation).

(b) The spectrally normalised intensity of the red radiation.

(c) The spatially normalised intensity of the infra-red radiation (i.e. the intensity of the reflected infra-red radiation divided by the sum of the intensities of the infra-red radiation for all scanned areas of the current track).

(d) The spatially normalised intensity of the red radiation.

(e) The spatially normalised intensity of the green radiation.

Instead of using these values directly, they can if desired be transformed using stored data representing mean values and dispersion factors for those components. For example, each of the k components may comprise the difference between the spectrally (or spatially) normalised intensity value and the average of that value, divided by the dispersion factor.

This will result in the calculation of a k-dimensional local feature vector $LFV_{i,l}$ (where i=1 to N, and l=1 to L) for each scanned area, this vector varying for each target class (because the stored average values and dispersion factors differ depending upon target class).

If desired, each component of each of the k-dimensional vectors can then be compared with a stored range (which may differ for each target class), and the test specimen may be classified as a counterfeit if one (or a predetermined number) of the components lies outside the respective range. Thus, it is possible to avoid further processing operations if the first pre-processing operation indicates that the test specimen produces measurements significantly outside those expected for genuine items.

A second part of the pre-processing operation involves combining the local feature vectors $LVF_{i,l}$ for each of the lines into a single k-dimensional global feature vector $GFV_i$. There would thus be produced N such global feature vectors for each test specimen. The global feature vectors may be formed by summing the individual components of each of the local feature vectors associated with the line. In addition, if desired, a further transformation operation can be performed, similar to that carried out in the first stage of the pre-processing operation. Thus, each summed component may be adjusted by subtracting from it a stored average value for this component, and dividing by a dispersion factor. Again, these values may vary depending upon the target class.

The global feature vectors may also be compared with stored ranges. In this case also, this may be achieved by comparing each component of the k-dimensional global feature vector with a respective range. The test specimen is deemed counterfeit if one, or a predetermined number, of vector components lies outside the respective range.

The third stage of the pre-processing operation involves combining the N global feature vectors $GFV_i$. This is achieved by separately summing the respective components of the vectors to form a single global surface feature vector AGF, having k dimensions. Again, each component may be transformed in a similar manner to the transformations mentioned above to take into account stored average and/or dispersion data.

The pre-processing system 7 thus results in a surface feature vector AGF which will differ depending upon the target class, assuming that transformation operations taking into account stored data appropriate to the target classes are used. Respective surface feature vectors $AGF_1$ to $AGF_n$ are then presented to the respective recognition units 15.1 to 15.n, as shown in FIG. 2.

It is to be noted that any one or all of the transformation operations mentioned above could be omitted. In principle, it would be possible to present the same feature vector AGF to all of the recognition units 15.1 to 15.n, and just use the individual characteristics of the recognition units for discriminating between classes. However, the use of one or more of the transformation operations has the advantage of normalising and compressing the data. Furthermore, it would be possible to arrange for stored data of a target class to be updated whenever the output unit 14 indicates that the test specimen corresponds to the target class. The use of a transformation operation based on this updated data would therefore avoid or mitigate problems due to drift, e.g. in the measuring components.

The dimension k can in principle be freely selected and therefore can advantageously be adapted to the test specimen 3 and/or the measuring system 1 and/or the preliminary processing system 7 and/or the classification system 8. The dimension k is, in the above example, 5, but may be smaller or greater.

Advantageously, each of the n recognition units 15.1 to 15.n is in the form of one neural network. A preferred arrangement of the recognition unit 15.1 (FIG. 2) to 15.n, which is shown in FIG. 3, comprises an input layer 19, a neuron layer 20 and an output layer 21.

The input layer 19 has a fixed number k of inputs and the neuron layer 20 has a pre-determined number m of neurons. The output layer 21 advantageously has an output component 22 having one output 23 and m inputs.

Figure 3:
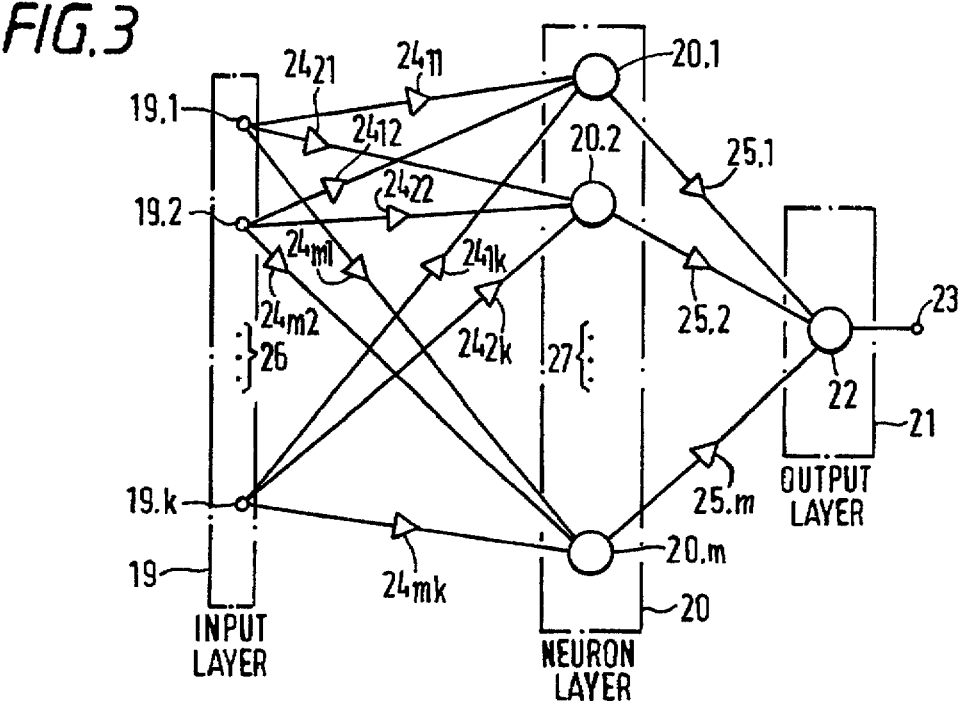
FIG. 3 shows a recognition unit of the classification system.

In FIG. 3, for the sake of a general and simple representation, only three of the k inputs actually present and only three of the m neurons actually present are shown.

20.1 denotes a first neuron, 20.2 a second neuron and 20.m an m-th neuron, whilst a first input of the input layer 19 is designated 19.1, a second input 19.2 and a k-th input 19.k.

Advantageously, each of the m neurons has k inputs, each input of each neuron 20.1 to 20.m being connected by a respective input weighting component $24_{ji}$ to each of the k inputs 19.1 to 19.k of the input layer 19; in the reference numeral for the input weighting component $24_{ji}$, the index i refers to the i-th input 19.i of the input layer 19 and the index j refers to the j-th neuron 20.j connected to the input 19.i by the input weighting component $24_{ji}$. To give an example of this, the second neuron 20.2 is connected at its input side by the input weighting component $24_{21}$ to the first input 19.1 of the input layer 19 and further connected by the input weighting component $24_{2k}$ to the k-th input 19.k of the input layer 19.

Each neuron 20.j of the m neurons 20.1 to 20.m is connected at its output side via a respective output weighting component 25.j to the output component 22, the index j in the reference numeral for the output weighting component referring to the j-th neuron 20.j.

The first three dots 26 indicate the inputs 19.x, not shown in FIG. 3, of the input layer 19, the index x being, in the complete integer range, greater than two and less than k, whilst the second three dots 27 represent the neurons 20.y that are not shown, the index y being, in the complete integer range, greater than two and less than m.

A target class lies inside the k-dimensional space, it being possible to describe a single target class in general by a plurality of vectors that are different from one another. The part of the k-dimensional space that can be occupied by a target class is advantageously divided into sections in a preparatory or learning phase of the process, the sections adjoining or being separate from one another in the space, and each section being determined by a respective target vector W which advantageously is k-dimensional.

The target class, therefore, is described in general by a number m of different prototype or target vectors $W_j$, it being possible for the number of target vectors $W_j$ of different target classes to be different. In the embodiment of FIG. 3, each of the m neurons 20 is associated with a respective target vector $W_j$ of the target class. A target vector $W_j$ of a target class is defined by the weighting components $24_{ji}$ connected to the neuron 20, which are advantageously determined by learning, and, if necessary, continuously adapted, in the preparatory phase. The number m may for example be from 5 to 10.

In operation of each of the recognition units 15.1 to 15.n, it is assumed that X represents the associated one of the input surface features vector $AGF_1$ to $AGF_n$. In each unit there is determined a target vector $W_c$ that, amongst all the m target vectors $W_j$ of the target class, has the least value of a distance d from the surface feature vector X. The distance d is advantageously the Euclidean distance between the target vector $W_j$ and the surface feature vector X. However, the distance d may be a different variable which can determine that target vector $W_c$ which, of the m target vectors $W_j$, is closest to the feature vector X. Another example of an advantageous variable for the distance d is the absolute distance or the Manhattan (city block) distance between a target vector $W_j$ and the feature vector X. The Euclidean distance d between two k-dimensional vectors $W_j$ and X is defined as follows:

$$d_j = [(W_1 - X_1)^2 + (W_2 - X_2)^2 + \ldots + (W_k - X_k)^2]^{1/2} \quad (G1).$$

The process for the classification of the pattern that can be described by a k-dimensional feature vector X can especially advantageously be carried out concurrently if the classification system 8 has at least one neural network. Advantageously, the neural network is a so-called LVQ (Learning Vector Quantisation) type according to Kohonen (Teuvo Kohonen et al.: Statistical Pattern Recognition with Neural Networks, Proceedings of 2th Annual IEEE International Conference on Neural Networks, volume 1, 1988, pages 61 . . . 68) which has the structure shown in FIG. 3.

With j from 1 . . . m, the values of the input weighting components $24_{j1}$ . . . $24_{jm}$ of the neuron 20.j are advantageously designed according to a target vector $W_j$, and are variable. The values of the input weighting components $24_{j1}$ . . . $24_{jm}$ are advantageously determined and, if necessary, adapted in the learning phase. Each neuron 20.j determines at least the distance $d_j$ by receiving at each input the difference between the input weighting component $24_{ji}$ and a component of the input vector X, by summing the squares of these differences, and then taking the square root. The neuron 20.j—for j from 1 ... k— transmits to the output layer the logic value "1" only when it has the minimum distance $d_c$.

Advantageously, the output component 22 is an OR-gate and the values of the weighting components 25.1 to 25.m are set to one. If one recognition unit outputs a logic "1", the output component 22 transmits this as an indication of a recognised test specimen, and preferably also transmits an indication of which recognition unit issued the logic "1", thereby indicating the target class.

A normal LVQ network would be arranged so that the neuron 20.c with the minimum distance would always transmit the logic value "1". In the present embodiment, the neuron 20.c with the minimum distance $d_c$ additionally tests for two further conditions (G2) and (G3), set out below. A logic "1" is transmitted only if all three conditions (G1), (G2) and (G3) are fulfilled; otherwise, the neuron 20.c transmits the value logic "0".

Accordingly, the determined target vector $W_c$ and the feature vector X are precisely analysed in further process steps in such a manner that it is certain, with an expected reliability, whether the feature vector X is to be assigned to the target class.

In a first advantageous process step, the greatest magnitude component of the surface feature vector X is compared with a limiting parameter $q_{max}$, the parameter $q_{max}$ advantageously being determined in the learning phase. Using a function maximum( ), the following condition is therefore obtained:

$$\text{Maximum}(|X_1|, |X_2|, \ldots, |X_k|) \leq q_{max} \quad (G2).$$

In a second advantageous process step, the subtraction $W_c-X$ is carried out component by component for all k components and the amount of the difference of two corresponding components is compared with a space limiting parameter $q_{c1max} \ldots q_{ckmax}$ assigned component by component, the k parameters $q_{c1max} \ldots q_{ckmax}$ advantageously being determined in the learning phase. With i from 1 to k, the following condition is therefore obtained:

$$|W_{ci}-X_i| \leq q_i \text{ with i from 1 ... k} \quad (G3).$$

The feature vector X is assigned to the target class of the target vector $W_c$ when, and only when, the conditions (G2) and (G3) apply.

Figure 4:
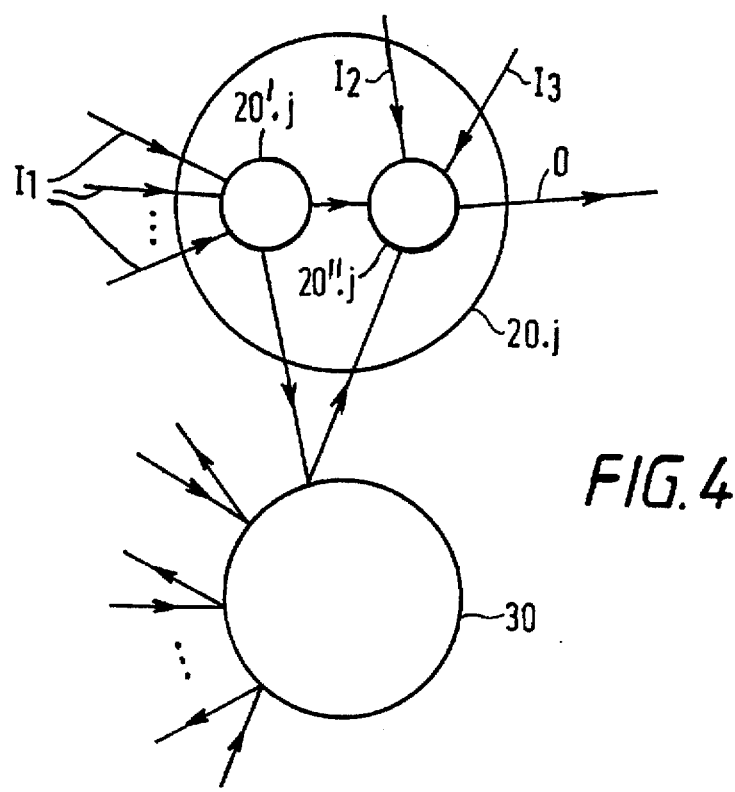
FIG. 4 indicates one way in which the recognition unit may operate.

FIG. 4 shows by way of example how one neuron 20.j may operate. A first part 20'.j receives inputs $I_1$ from the weighting components $24_{ji}$, calculates the distance $d_j$ and sends this to a controlling unit 30. This compares the distances received from all the neurons, and, for the neuron with the shortest distance, sends a signal to a second part 20".j of the neuron. This has inputs $I_2$, $I_3$ receiving values $q_{max}$, $q_i$ permitting the part to test for conditions (G2), (G3). If the conditions are met, a logic "1" is output on output line O.

Each target vector $W_j$—for j from 1 ... k—of a target class advantageously lies in a part $R_j$ of the k-dimensional space that is bounded by polygons of a Voronoï diagram (J. M. Chassery et al.: "Diagramme de Voronoï appliqué à la segmentation d'images et à la détection d'événements en imagenrie multi-sources, Traitement du Signal, volume 8, No. 3).

An activity space of the neuron 20.j—for j from 1 ... k—is advantageously a limited region of the part $R_j$ of the space, the limitation being achieved by conditions (G2) and (G3).

Figure 5:
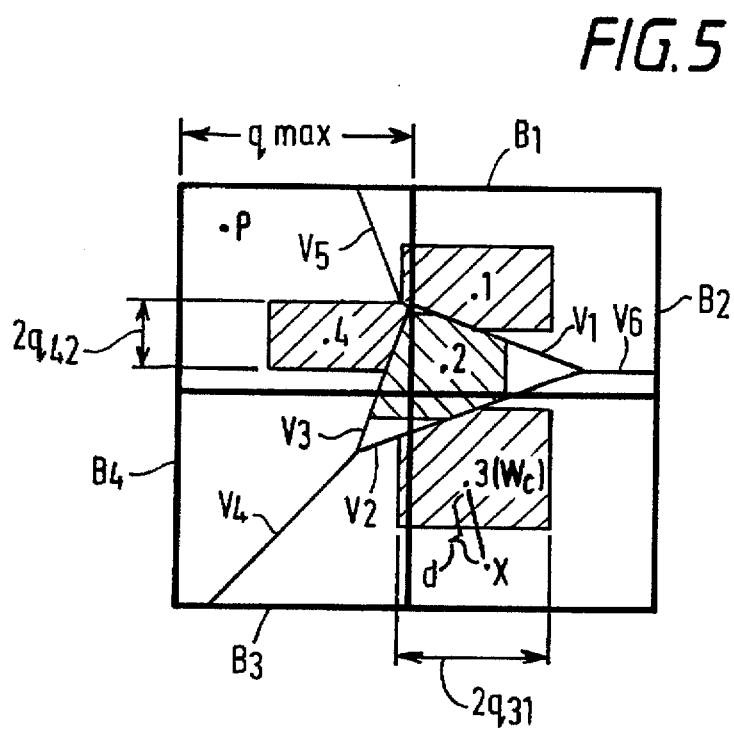
FIG. 5 is a diagram of the activity spaces of a recognition unit of the classification system.

FIG. 5 is a representation of the activity space for a particular recognition unit. For the purpose of simplification and clarity, it is assumed that the input vector X has two dimensions (i.e. k=2), lying in the plane of the diagram, and that there are four neurons 20.j. Each neuron is associated with a target vector $W_j$, the target vectors being indicated on the diagram by reference numbers 1, 2, 3 and 4. The lines $V_1$ to $V_6$ represent the boundaries of the Voronoï polygons. Thus, the line $V_1$ between vectors 1 and 2 is defined by those vectors which are equidistant from the vectors 1 and 2.

The boundaries B1, B2, B3 and B4 are created by condition (G2), and exclude any vectors which lie substantially outside the area of interest. It is noted that condition (G2) could alternatively be tested as a final part of the pre-processing stage, so that a vector X is only presented to the classification stage if condition (G2) is met.

Within each Voronoï polygon area, there is a shaded area defined by rectilinear boundaries which are created by condition (G3). Without condition G3, any vector lying in the polygon containing vector 2 would activate the associated neuron. However, because of condition (G3), only vectors lying within the shaded area containing vector 2 will activate the neuron, so that the activation area for that neuron has been restricted. By applying different restrictions to the different neurons, it will be seen from FIG. 5 that the overall shape of the activation area for the complete recognition unit can be complex, and can be controlled to achieve good acceptance of genuine test specimens and good rejection of counterfeits.

It will be seen from FIG. 5 that the range limits for one component of the vector (e.g. $2 \times q_{31}$, being the limits for the first component of vectors lying within the activity space of neuron 3) may be of a different magnitude from the ranges for other components (e.g. $2 \times q_{42}$, being the range limit for the second component of vectors lying in the activity space of neuron 4). Generally, there would also be stored different range limits for different neurons, so that the range limit $2q_{42}$ for the second component of vectors lying in the activity space of neuron 4 would not necessarily be the same as the range limit $2q_{22}$, being the range limit for the second component of vectors lying within the activity space for neuron 2. Furthermore it is not essential that the boundaries be symmetrically located about the target vectors 1, 2, 3 and 4.

As shown in FIG. 5, condition (G3) applies rectilinear limits to the activity spaces. This results from the fact that each component of the difference between the input vector X and the target vector $W_c$ is compared separately with a respective limit value. This allows for simple processing. However, it would alternatively be possible to have other conditions apply, such as a distance measurement. For example, the distance measurement $d_c$ which is derived when determining the neuron 20.c associated with the shortest distance between the target vector $W_c$ and the input vector X may be compared with a range to limit the activity space for the neuron. The result of this would be that the shaded areas in FIG. 5 would no longer have rectilinear boundaries, but would instead have elliptical boundaries, possibly intersected by the lines $V_1$ to $V_6$.

It will also be appreciated, that the boundaries B1 to B4 also need not be symmetrically distributed, and there may be different values of $q_{max}$ for different components of the input vector X.

Because the recognition units 15.1 to 15.n are, in known manner, learning neural networks, the values of their m times k input weighting components $24_{ji}$—with j from 1 to m and i from 1 to k—can best be determined by teaching in known manner. For example, during the training process the apparatus can be fed with test specimens of known target classes, and known counterfeits. Within each recognition unit, it is determined which target vector is closest to the surface feature vector X. If the recognition unit is associated with the correct target class of the test specimen, then the weighting components associated with that target vector are adjusted so as to bring it closer to the feature vector X. If the test specimen is not of the associated target class, the weighting components are adjusted to move the target vector away from the feature vector (X). The weighting components associated with the other target vectors of that recognition unit are not adjusted. (In an alternative arrangement, the other weighting components may also be adjusted using an adaptive mechanism to increase the convergence speed.) The amounts by which the weighting components are adjusted can initially be large, but can be decreased as the training procedure progresses. This allows a very rapid iterative training process which derives the target vectors and hence the discriminant surfaces defined by the boundaries of the Voronoï polygons.

As a result of the training process, it is possible to arrange for the target vectors for a particular target class to be relatively close together, and to be distant from vectors X which are produced as a result of testing counterfeit specimens. Nevertheless, there may be other counterfeits, perhaps not used in the training process, which would produce vectors within the Voronoï polygon associated with a target vector, such as shown at P in FIG. 4. However, by applying conditions (G2) and (G3), limits are placed on the permissible values for the input vector X so it is possible to avoid erroneously accepting such a vector P as a genuine specimen. By using a neural network-type arrangement to perform the classification according to discriminant data derived in an iterative training process, but then applying one or more boundary tests to limit the acceptance volume, it becomes much easier to avoid erroneously accepting counterfeits, even when those counterfeits are not used in the training process.

The limiting parameters $q_j$ and $q_{jimax}$—with j from 1 to m and i from 1 to k—can advantageously also be determined for all target classes by teaching in known manner. Alternatively, they may be separately determined in such a manner as to reduce the activity space sufficiently to minimise the risk of counterfeits being classified as genuine specimens.

One possibility would be for the learning procedure to record which neuron 20.c is associated with the shortest distance whenever a test specimen is recognised during the training session. The ranges $q_i$ for each of the k components of the vector $W_c$ can then be calculated to be the standard deviation (or proportional to the standard deviation) of the respective component of the vectors X generated in response to those test specimens. Any calculated range can then be adjusted, if necessary, to exclude any vectors X generated in response to other test specimens.

If necessary, the starting values required for teaching are entered by means of suitable test specimens 1, or they are transmitted to the classification system 8 by the initialisation system 12.

As indicated above, the parameters used in the transformations applied to the feature vectors may be updated each time a specimen has been tested and found to correspond with a target class. Alternatively, or additionally, the weighting components may be updated also, so that the neural networks 15.1 to 15.n are continuously being re-trained during operation of the apparatus. The limiting parameters used in condition (G2) and/or (G3) may also be updated in a similar manner.

Although the above embodiment has been described in the context of measurements of reflected colours, the invention is equally applicable to other types of measurements, for example detection of lines of magnetic ink on a banknote, or detection of surface contours on a coin.

The above embodiment stores data (the weighting components $24_{ji}$) defining the target vectors. Alternatively, it is possible only to store data defining the discriminant surfaces, i.e. the boundaries of the Voronoï polygons.

I claim:

1. A method of validating an article of currency by determining whether the article belongs to a target class associated with a particular denomination in a particular orientation, the method comprising producing a k-dimensional feature vector (X) describing the article, determining from among a plurality of target vectors all associated with said target class that target vector ($W_c$) which is closest to the feature vector (X), and designating the article as belonging to the target class if the components of the feature vector (X) meet a predetermined criterion indicating that the feature vector (X) lies within a predetermined boundary containing the closest target vector ($W_c$).

2. A method as claimed in claim 1, wherein the components of the feature vector (X) are determined to meet said predetermined criterion if the closest target vector ($W_c$) has a predetermined relationship with the feature vector (X).

3. A method as claimed in claim 2, wherein the predetermined relationship is different depending on which target vector is closest.

4. A method as claimed in claim 1, wherein the components of the feature vector (X) are determined to meet said predetermined criterion if the individual components each meet a respective criterion.

5. A method as claimed in claim 4, wherein the components of the feature vector (X) are determined to meet said predetermined criterion if the difference between each individual component of target vector ($W_c$) and the corresponding component of the feature vector (X) is within a predetermined range.

6. A method as claimed in claim 1, wherein each of the target vectors associated with a target class lies within a respective Voronoï polygon, and wherein said predetermined criterion restricts the area of the Voronoï polygon within which a feature vector (X) is deemed to represent an article of the target class.

7. A method as claimed in claim 1, wherein the target vector ($W_c$) closest to the feature vector (X) is determined by measuring the Euclidean distance between the target vector ($W_c$) and the feature vector (X).

8. A method as claimed in claim 1, wherein at least one neural network is used to determine the target vector ($W_c$) closest to the feature vector (X).

9. A method as claimed in claim 8, wherein the neural network is an LVQ network.

10. A method as claimed in claim 8, wherein, for every target vector of a target class, the distance d to the feature vector (X) is calculated using one neuron or neuron-like part.

11. A method as claimed in claim 1, including the step of deriving the feature vector (X) using stored statistical data representative of the target class.

12. A method as claimed in claim 11, including the step of updating the statistical data representative of the target class on the basis of measurements of a test specimen determined to belong to that target class.

13. A method of validating an article of currency, the method comprising:

taking measurements of the article;

deriving a feature vector (X) descriptive of the article from said measurements;

determining whether the feature vector (X) lies within any one of a plurality of Voronoï polygons associated with a target class representing a particular denomination in a particular orientation;

determining whether the feature vector (X) also lies within an acceptance boundary restricting the area of said one Voronoï polygon; and providing a signal indicating that the article belongs to said target class if (a) the feature vector (X) has been determined to lie within said Voronoï polygon, and (b) the feature vector (X) also lies within said acceptance boundary.

14. A method of classifying a test article as one of a plurality of acceptable denominations of articles of currency, the method comprising applying pre-processing to measurements of the article using statistical data relating to said acceptable denominations so as to derive, for each denomination, a respective feature vector (X), the components of each feature vector being respectively scaled according to the respective statistical data, applying to each feature vector (X) a statistical classification process which employs discriminant surfaces defined by respective sets of weighting values previously derived using an iterative training process from training articles known to be valid or invalid examples of said denominations, and modifying the statistical data associated with a denomination and used in the pre-processing step in response to classifying a test article as that denomination.

15. A method of classifying a test article as one of a plurality of acceptable denominations of articles of currency, comprising applying a statistical classification process which employs discriminant surfaces defined by respective sets of weighting values previously derived using an iterative training process from training articles known to be valid or invalid examples of said denominations, the classification process being arranged to distinguish between said denominations, and further applying an acceptance boundary test which limits the acceptance volume for each denomination so as to exclude forgeries not corresponding to said training articles.

16. Apparatus for validating an article of currency, the apparatus comprising a measuring system, a preliminary processing system and a classification system for the classification of an article described by a k-dimensional feature vector (X) within at least n possible target classes, the preliminary processing system being responsive to measurements of physical features of a test item supplied by the measuring system for deriving the feature vector (X) and being operable to provide the feature vector (X) to the classification system, wherein the classification system comprises an output unit and a plurality of LVQ neural network recognition units each connected at its input side to the preliminary processing system and its output side to the output unit, each recognition unit being operable to recognise exactly one class, the output unit being arranged to provide an output indicative of the determined class in response only to exactly one recognition unit providing an output indicative of the class.

17. Apparatus for validating an article of currency, the apparatus comprising a measuring system, a preliminary processing system and a classification system for the classification of an article that can be described by k-dimensional feature vector (X), the preliminary processing system being responsive to measurements of physical features of a test specimen supplied by the measuring system for deriving the k-dimensional feature vector (X) and supplying the feature vector to the classification system, the classification system comprising a recognition unit for determining whether or not the article belongs to a target class representing a particular denomination in a particular orientation, the recognition unit being operable to determine which, amongst a plurality of target vectors associated with that target class, is the closest target vector ($W_c$) to the feature vector (X), and to designate the article as belonging to the target class if the components of the feature vector (X) meet a predetermined criterion indicating that the feature vector (X) lies within a predetermined boundary containing the closest target vector ($W_c$).

18. Apparatus according to claim 17, wherein the recognition unit comprises an input layer, and a neuron layer connected at its input side to the input layer via input weighting components and at its output side to an output layer, the input weighting components defining the target vectors for the recognition unit.

19. Apparatus as claimed in claim 18, wherein the weighting components each has values which have been determined during a training process.

20. Apparatus as claimed in claim 18, including means for varying the values of weighting components in accordance with measured physical features of a test specimen when that test specimen has been found to belong to the target class of the recognition unit including those weighting components, and when the weighting components define the target vector closest to the feature vector (X) for that specimen.

21. A device as claimed in claim 17, wherein the preliminary processing system is operable to derive different feature vectors (X) for respective target classes on the basis of different sets of statistical data each associated with a respective denomination, the respective feature vectors (X) each being applied to a respective recognition unit.

22. Apparatus as claimed in claim 21, including means for modifying the statistical data related to a denomination in accordance with measured physical features of an article which has been tested in response to determining that the article belongs to the class associated with that denomination.

23. Device comprising a measuring system, a preliminary processing system and a classification system for the classification of a pattern that can be described by a k-dimensional vector (X), especially a pattern of a banknote or a coin, within at least a number of possible target classes by means of the values of physical features supplied by the recording system, wherein the recording system, the preliminary processing system and the classification system are connected in the order in which they are listed substantially to form a chain at the output of which a service system is connected, characterised in that (a) the classification system comprises an output unit and several LVQ neural network recognition units each connected at its input side to the preliminary processing system and at its output side to the output unit, and (b) a determined class of the pattern is transmitted by the output unit to an output channel if that class is recognised by a single recognition unit and no other recognition unit recognises a class.

* * * * *